(12) United States Patent
Kim et al.

(10) Patent No.: US 10,020,669 B2
(45) Date of Patent: Jul. 10, 2018

(54) WIRELESS POWER RECEIVING APPARATUS AND POWER CONTROL METHOD THEREOF, AND WIRELESS POWER SYSTEM

(71) Applicant: Electronics and Telecommunications Research Institute, Daejeon (KR)

(72) Inventors: Seong Min Kim, Daejeon (KR); Jung Ick Moon, Daejeon (KR); Je Hoon Yun, Daejeon (KR); In Kui Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 350 days.

(21) Appl. No.: 14/953,102

(22) Filed: Nov. 27, 2015

(65) Prior Publication Data

US 2016/0156200 A1     Jun. 2, 2016

(30) Foreign Application Priority Data

Nov. 27, 2014  (KR) .................. 10-2014-0167558
Nov. 5, 2015   (KR) .................. 10-2015-0155199

(51) Int. Cl.
 *H02J 7/02*     (2016.01)
 *H01F 37/00*    (2006.01)
 *H02J 50/20*    (2016.01)
 *H02J 50/80*    (2016.01)

(52) U.S. Cl.
 CPC .............. *H02J 7/025* (2013.01); *H02J 50/20* (2016.02); *H02J 50/80* (2016.02)

(58) Field of Classification Search
 CPC .. H02J 7/025; H02J 17/00; H02J 50/20; H02J 50/80; H01F 38/14
 USPC ........................................ 307/104; 320/108
 See application file for complete search history.

(56) References Cited

U.S. PATENT DOCUMENTS

| | | |
|---|---|---|
| 2011/0156490 A1 | 6/2011 | Hwang et al. |
| 2013/0307344 A1 | 11/2013 | Cheon et al. |
| 2014/0152247 A1 | 6/2014 | Etri |

FOREIGN PATENT DOCUMENTS

| | | |
|---|---|---|
| KR | 1020090098239 A | 9/2009 |
| KR | 1020110074020 A | 6/2011 |

*Primary Examiner* — Hal Kaplan
(74) *Attorney, Agent, or Firm* — William Park & Associates Ltd.

(57) ABSTRACT

Disclosed is a wireless power receiving apparatus, which includes: a residual power collecting unit configured to collect residual power remained after supplying an RF power signal to a load while receiving the RF power signal through a resonator; a power selecting unit configured to select one of the RF power signal and a power signal of an auxiliary battery according to a reception state of the RF power signal; a communication unit configured to receive the power signal of the auxiliary battery and perform wireless communication with the wireless power transmitting apparatus, when a supply of power to the load is required in a state in which the transmission of the RF power signal from the wireless power transmitting apparatus is stopped; and a controller configured to request the transmission of the RF power signal to be supplied to the load.

15 Claims, 5 Drawing Sheets

[FIG.1]
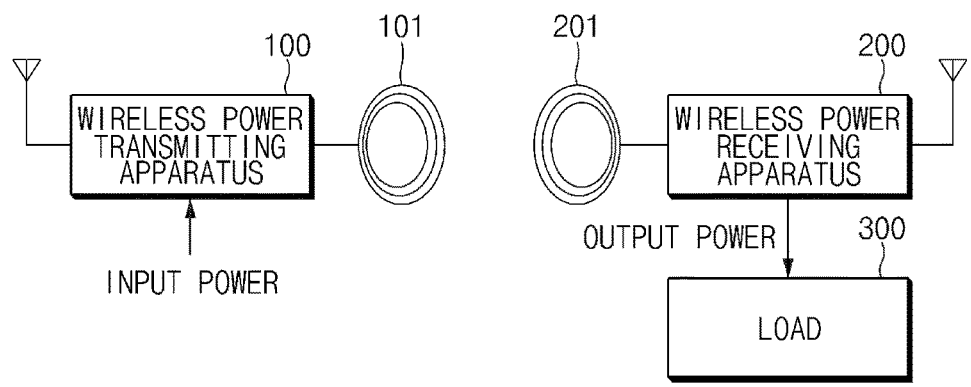
[FIG.2]
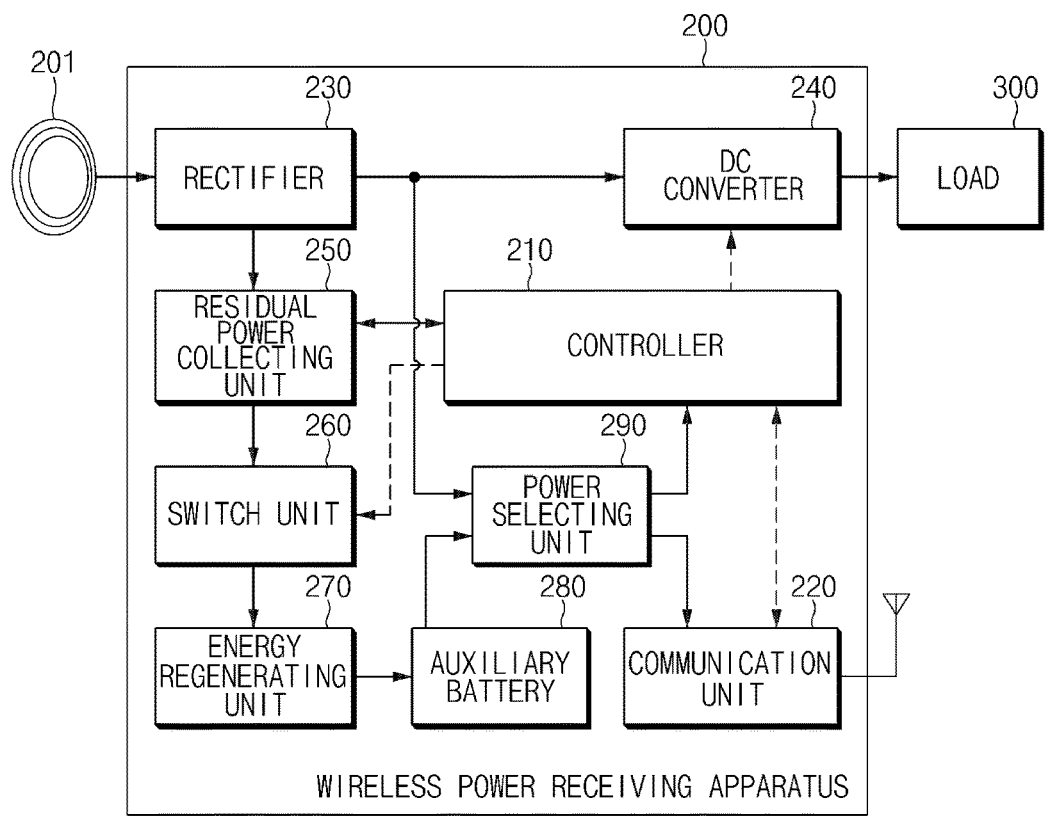

[FIG.3]
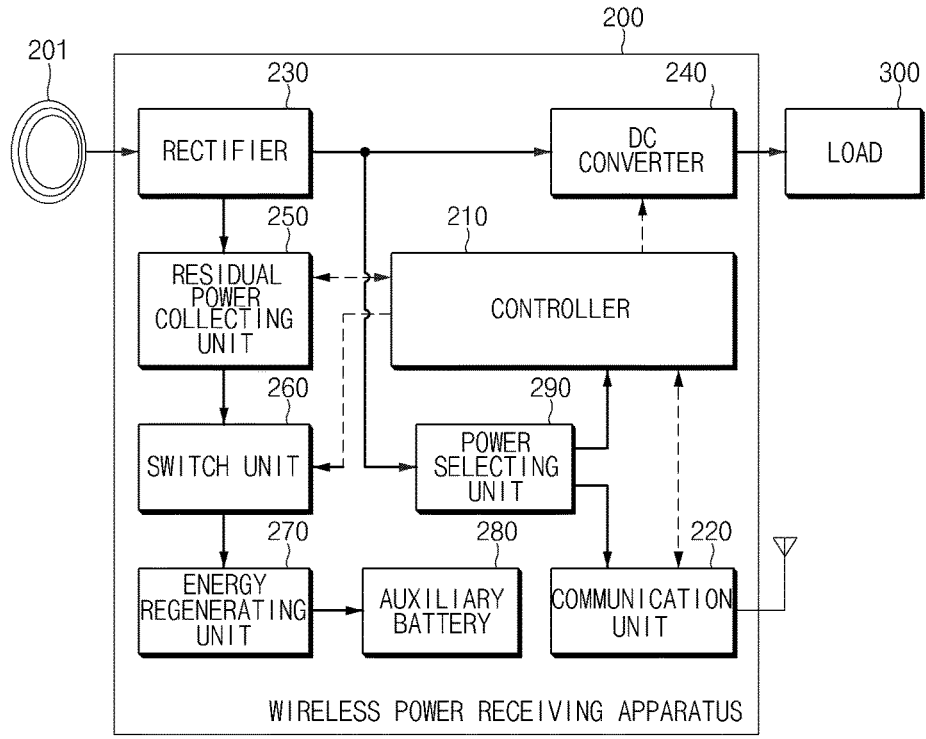
[FIG.4]
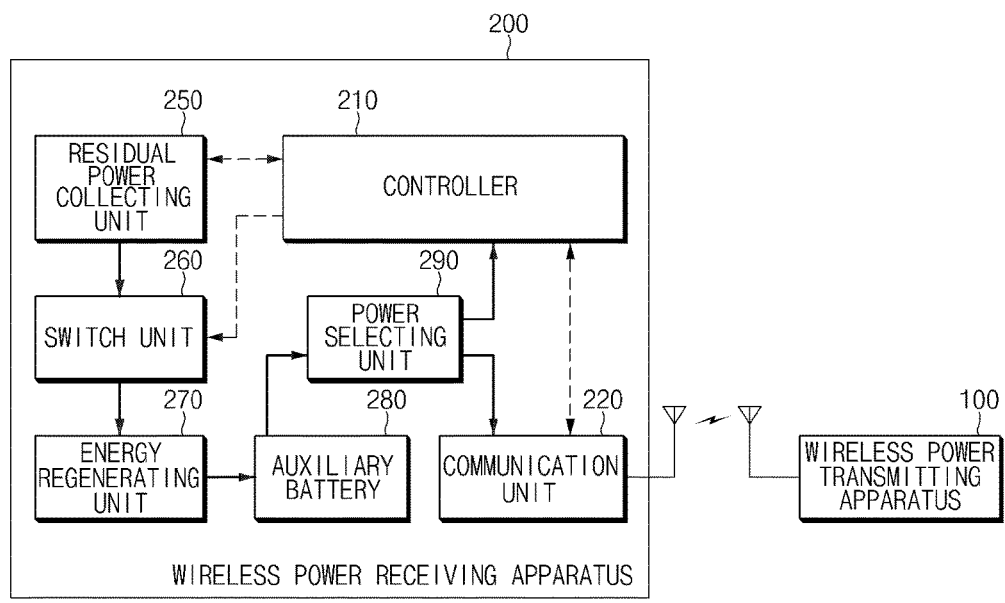

[FIG.5]
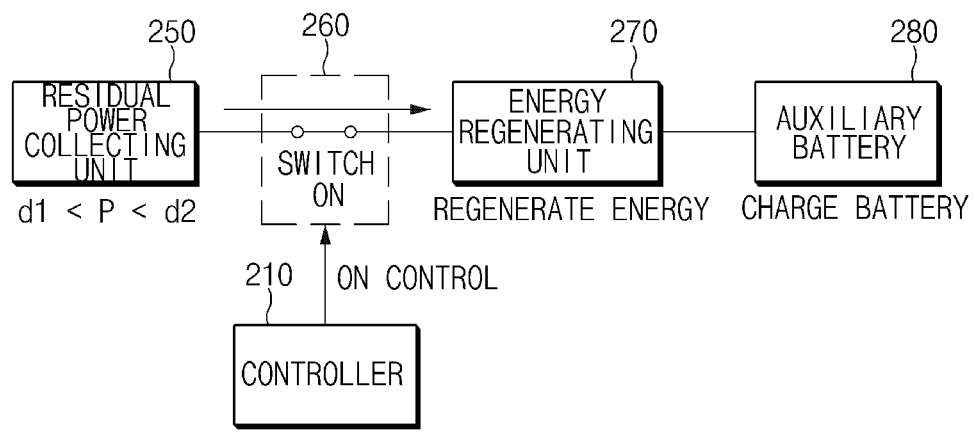
[FIG.6]
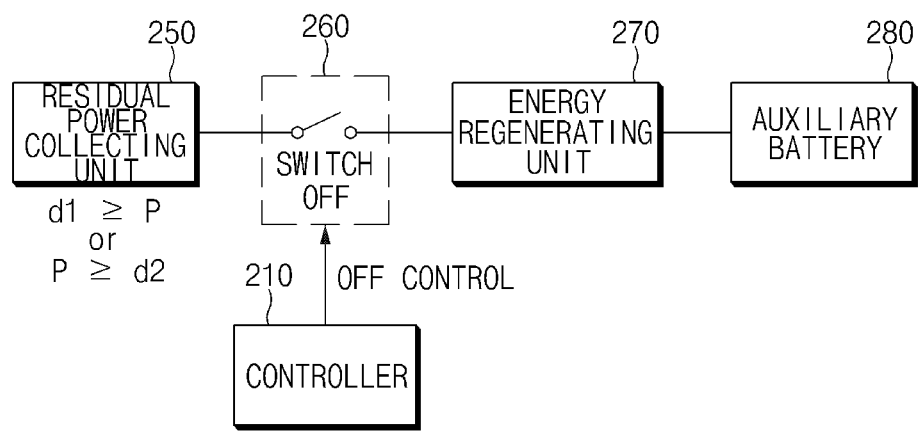

[FIG.7]
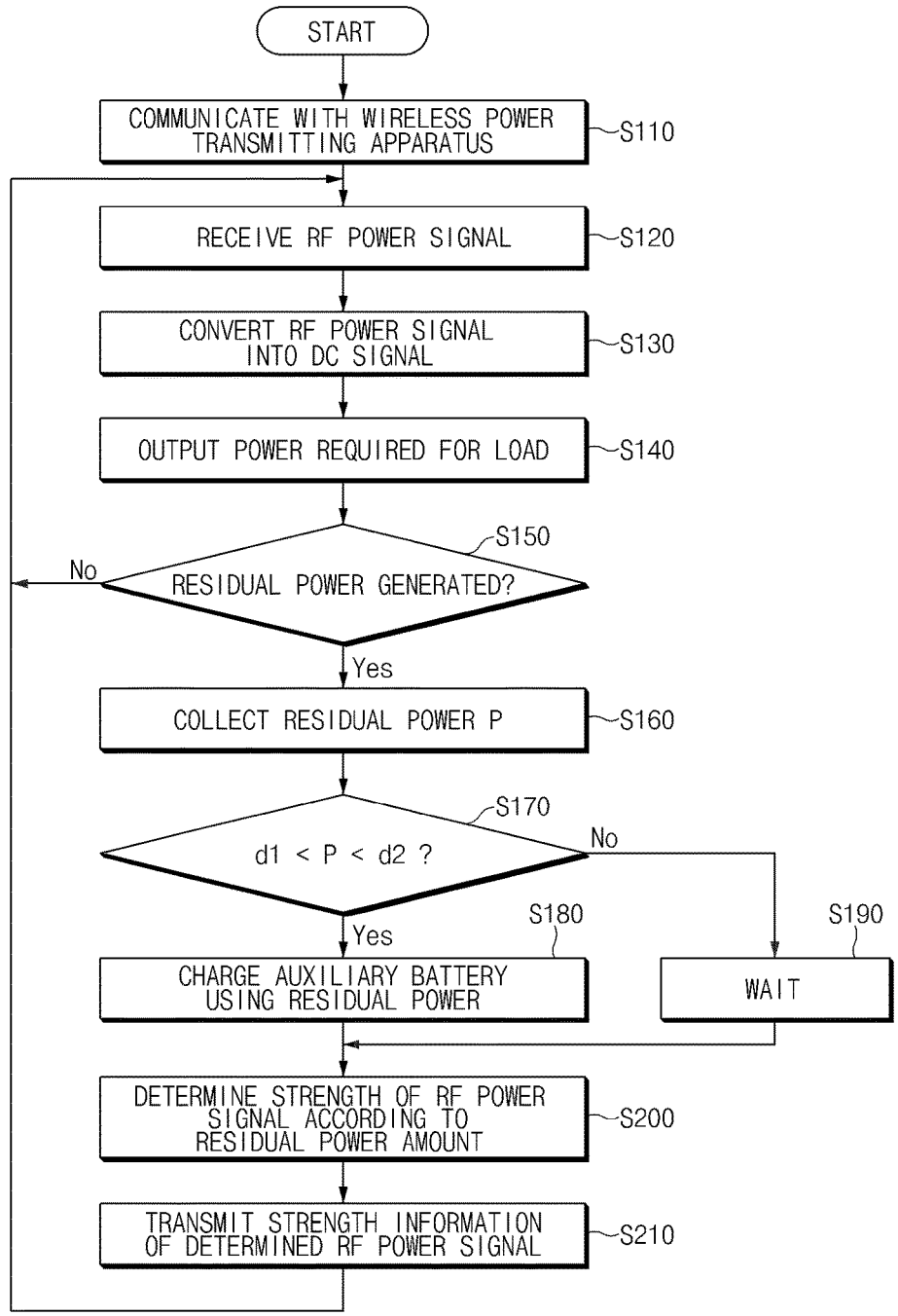

[FIG.8]
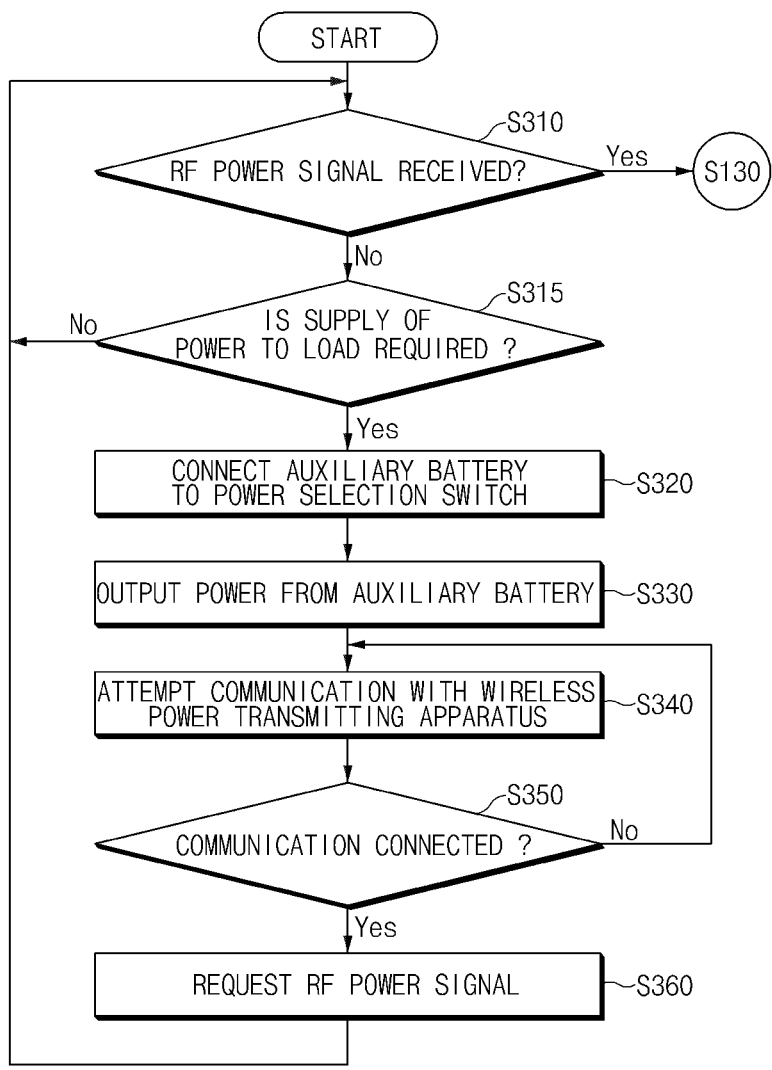

WIRELESS POWER RECEIVING APPARATUS AND POWER CONTROL METHOD THEREOF, AND WIRELESS POWER SYSTEM

CROSS-REFERENCE TO RELATED APPLICATION

This application claims the benefit of priority to Korean Patent Application No. 10-2014-0167558, filed on Nov. 27, 2014 in the Korean Intellectual Property Office, and Korean Patent Application No. 10-2015-0155199, filed on Nov. 5, 2015 in the Korean Intellectual Property Office, the disclosure of which is incorporated herein in its entirety by reference.

BACKGROUND OF THE INVENTION

Field of the Invention

The present disclosure relates to a wireless power receiving apparatus, a power control method thereof, and a wireless power system.

Description of the Related Art

A wireless power transmitting system requests transmission of wireless power through communication between a transmitting apparatus and a receiving apparatus. When the transmitting apparatus transmits a radio frequency (RF) power signal, the receiving apparatus receives the RF power signal and supplies power to a load.

In this case, the receiving apparatus requires power to initially start the communication with the transmitting apparatus, but if there is no battery of the wireless power receiving apparatus or if the power of the battery is completely discharged, the wireless power receiving apparatus is not able to receive power for initial driving.

Accordingly, in the wireless power transmitting system, the transmitting apparatus escapes from a standby state periodically and transmits power for a certain time in order to initially drive the receiving apparatus, waits until receiving a response for starting the communication from the receiving apparatus, and is switched again to the standby state if there is no response for a certain time. Meanwhile, the receiving apparatus is initially driven using power periodically input from the transmitting apparatus and starts the communication with the transmitting apparatus.

However, in the above mentioned method, since the transmitting apparatus should periodically transmit power in order to initially drive the receiving apparatus, unnecessary power is transmitted such that the energy efficiency may be deteriorated.

SUMMARY OF THE INVENTION

The present disclosure has been made in view of the above problems, and provides a wireless power receiving apparatus for collecting residual power except for power required from a load among RF power signals transmitted from a transmitting apparatus and driving a receiving apparatus using the collected residual power when there is no supplied power, a power controlling method thereof, and a wireless power system.

In accordance with an aspect of the present disclosure, a wireless power receiving apparatus includes: a residual power collecting unit configured to collect residual power remained after supplying an RF power signal to a load while receiving the RF power signal from a wireless power transmitting apparatus through a resonator; a power selecting unit configured to select one of the RF power signal and a power signal of an auxiliary battery according to a reception state of the RF power signal and output a power signal; a communication unit configured to receive the power signal of the auxiliary battery from the power selecting unit and perform wireless communication with the wireless power transmitting apparatus, when a supply of power to the load is required in a state in which the transmission of the RF power signal from the wireless power transmitting apparatus is stopped; and a controller configured to request the transmission of the RF power signal to be supplied to the load through the wireless communication with the wireless power transmitting apparatus. The power selecting unit selects the power signal of the auxiliary battery and supplies an operation power for an initial driving to the communication unit and the controller, when the supply of the power to the load is required in a state in which the RF power signal is not input. The wireless power receiving apparatus further includes a switch unit configured to switch the residual power output from the residual power collecting unit, wherein the controller checks an amount of the collected residual amount, controls to turn-on the switch unit when the amount of the collected residual amount is within a preset range, and controls to turn-off the switch unit when the collected residual amount exceeds the preset range. The wireless power receiving apparatus further includes an energy regenerating unit configured to generate energy from the collected residual power to provide the generated energy to the auxiliary battery, when the switch unit is turned on. The controller controls strength of the received RF power signal through the wireless communication while receiving the RF power signal from the wireless power transmitting apparatus. The controller checks an amount of the controlled residual power and adjusts strength of the received RF power signal according to the amount of the collected residual power, and transmits strength information on the adjusted RF power signal to the wireless power transmitting apparatus. The controller adjusts strength of the received RF power signal according to a power amount required from the load and a reception state of the RF power signal, and transmits strength information on the adjusted RF power signal to the wireless power transmitting apparatus. The wireless power receiving apparatus further includes: a rectifier configured to rectify the RF power signal received from the wireless power transmitting apparatus; and a DC converter configured to convert the rectified RF power signal into a DC signal to provide the DC signal to a load connected to the wireless power receiving apparatus.

In accordance with another aspect of the present disclosure, a power control method includes: by a wireless power receiving apparatus, collecting residual power remained after supplying an RF power signal to a load while receiving the RF power signal from a wireless power transmitting apparatus through a resonator; charging an auxiliary battery using the collected residual power; attempting wireless communication with the wireless power transmitting apparatus using a power signal output from the auxiliary battery when a supply of power to the load is required in a state in which transmission of the RF power signal from the wireless power transmitting apparatus is stopped; and requesting the transmission of the RF power signal to be supplied to the load to the wireless power transmitting apparatus. The power control method further includes: checking an amount of the collected residual amount when collecting the residual power; turning-on a switch unit which switches the residual power output to the auxiliary battery when the amount of the collected residual amount is within a preset range; and turning-off the switch unit when the collected residual amount exceeds the preset range. The power control method further includes generating energy from the collected residual power to provide the generated energy to the auxiliary battery, when the switch unit is turned-on. The power control method further includes controlling strength of the received RF power signal through the wireless communication while receiving the RF power signal from the wireless power transmitting apparatus. Controlling strength of the received RF power signal includes checking an amount of the controlled residual power and adjusting strength of the received RF power signal according to the amount of the collected residual power, and transmitting strength information on the adjusted RF power signal to the wireless power transmitting apparatus. Controlling strength of the received RF power signal includes: adjusting strength of the received RF power signal according to a power amount required from the load and a reception state of the RF power signal, and transmitting strength information on the adjusted RF power signal to the wireless power transmitting apparatus.

In accordance with another aspect of the present disclosure, a wireless power system includes: a wireless power transmitting apparatus configured to convert an input power into an RF power signal to transmit the RF power signal through a resonator; and a wireless power receiving apparatus configured to receive the RF power signal transmitted from the wireless power transmitting apparatus through a resonator and provide the received RF power signal to a load, and collect residual power remained after supplying the received RF power signal to the load to charge an auxiliary battery. The wireless power receiving apparatus attempts wireless communication with the wireless power transmitting apparatus, when supply of power to the load is required in a state in which the transmission of the RF power signal from the wireless power transmitting apparatus is stopped, and requests transmission of an RF power signal to be supplied to the load to the wireless power transmitting apparatus.

As described above, the present disclosure collects residual power except for power required from a load among RF power signals transmitted from the transmitting apparatus and initially drives the receiving apparatus using the collected residual power when there is no supplied power. Accordingly, it is not necessary for the transmitting apparatus to transmit a RF power signal periodically until the receiving apparatus responds, thereby increasing the energy efficiency.

BRIEF DESCRIPTION OF THE DRAWINGS

The objects, features and advantages of the present disclosure will be more apparent from the following detailed description in conjunction with the accompanying drawings, in which:

FIG. 1 is a block diagram illustrating a configuration of a wireless power system according to the present disclosure;

FIG. 2 is a block diagram illustrating a configuration of a wireless power receiving apparatus according to the present disclosure;

FIG. 3 is an exemplary diagram illustrating a power control operation of the wireless power receiving apparatus according to a first embodiment of the present disclosure;

FIG. 4 is an exemplary diagram illustrating a power control operation of the wireless power receiving apparatus according to a second embodiment of the present disclosure;

FIG. 5 and FIG. 6 are exemplary diagrams illustrating a charging operation of an auxiliary battery of the wireless power receiving apparatus according to the present disclosure; and FIG. 7 and FIG. 8 are flowcharts illustrating an operation flow of a power control method of the wireless power receiving apparatus according to the present disclosure.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

FIG. 1 is a block diagram illustrating a configuration of a wireless power system according to the present disclosure.

As shown in FIG. 1, the wireless power system may include a wireless power transmitting apparatus (hereinafter, referred to as 'transmitting apparatus') 100 and a wireless power receiving apparatus (hereinafter, referred to as 'receiving apparatus') 200.

The transmitting apparatus 100 may exchange information of wireless power transmission with the receiving apparatus 200 through wireless communication. In this case, the receiving apparatus 200 may determine strength of a RF power signal transmitted from the transmitting apparatus 100 and transmit the determined strength of the RF power signal to the transmitting apparatus 100. The transmitting apparatus 100 may transmit the RF power signal having a corresponding strength based on strength information of the RF power signal transmitted from the receiving apparatus 200.

In this case, the transmitting apparatus 100 and the receiving apparatus 200 may include a transmission resonator 101 and a reception resonator 201, respectively. The transmitting apparatus 100 may transmit the RF power signal through the transmission resonator 101, and the receiving apparatus 200 may receive the RF power signal from the transmitting apparatus through the reception resonator 201.

The receiving apparatus 200 may determine the strength of the RF power signal according to positions of the transmission resonator 101 and the reception resonator 201 and the transmission state of the RF power signal. In this case, the strength of the transmitted RF power signal may be determined based on a power amount required from a load 300 and a residual power. In this case, the receiving apparatus 200 may supply power to the load 300 and may determine the strength of the RF power signal to the extent of generating residual power of a certain amount.

The transmitting apparatus 100 may recognize that the reception resonator 201 approaches through the communication with the receiving apparatus 200. When the reception resonator 201 approaches, the RF power signal is generated using the power input from an AC or DC power terminal. In this case, the transmitting apparatus 100 may adjust the strength of the RF power signal output corresponding to the strength determined by the receiving apparatus 200.

The receiving apparatus 200 may provide power required from the load 300 among RF power signals transmitted from the transmitting apparatus 100 to the load 300, and may collect remaining residual power to charge an auxiliary battery 280. In this case, the load 300 may be an electronic device connected to the receiving apparatus to consume certain power, or may be a charging battery for charging power using power supplied from the receiving apparatus 200.

Meanwhile, when a supply of power to the load is requested in a state in which the supply of the power from an exterior is blocked, for example, the RF power signal is not received from the transmitting apparatus 100, the receiving apparatus 200 may attempt an initial driving using power of the auxiliary battery 280 which is previously charged.

The receiving apparatus 200 may request transmission of the RF power signal to be supplied to the load through wireless communication with the transmitting apparatus 100 after the initial driving using the auxiliary battery 280. In this case, when requesting the transmission of the RF power signal, the receiving apparatus 200 may transmit the request of the transmission of the RF power signal together with the strength information of the requested RF power signal. Alternatively, the receiving apparatus 200 may transmit the strength information of the requested RF power signal to the transmitting apparatus 100 after receiving the RF power signal from the transmitting apparatus 100.

Accordingly, a detailed configuration of the receiving apparatus 200 is described with reference to FIG. 2 in detail.

FIG. 2 is a block diagram illustrating a configuration of a wireless power receiving apparatus according to the present disclosure.

Referring to FIG. 2, the receiving apparatus 200 according to the present disclosure may include a controller 210, a communication unit 220, a rectifier 230, a DC converter 240, a residual power collecting unit 250, a switch unit 260, an energy regenerating unit 270, an auxiliary battery 280, and a power selecting unit 290.

The power requested from the load 300 may be continuously changed according to an operation state of a corresponding load 300. Accordingly, the controller 210 may determine the strength of the RF power signal output from the transmitting apparatus 100 so that residual power may exist in addition to the requested power.

In this case, the controller 210 may estimate a change amount of the power requested from the load 300 according to a communication state between the transmitting apparatus 100 and the receiving apparatus 200 and a type of the load 300 and determine an amount of the residual power collected by the residual power collecting unit 250.

Further, the controller 210 may control to start the wireless communication with the transmitting apparatus 100 by the communication unit 220. When the communication with the transmitting apparatus 100 is connected, the communication unit 220 may transmit the strength information of the RF power signal corresponding to a sum of the power required from the load 300 and the residual power to the transmitting apparatus 100.

When the RF power signal corresponding to the strength information transmitted to the transmitting apparatus through the communication unit 220 is transmitted through the transmission resonator 101 of the transmitting apparatus 100, the reception resonator 201 of the receiving apparatus 200 may receive the RF power signal to transfer the received RF power signal to the rectifier 230.

Accordingly, when the RF power signal is received, the controller 210 may control an operation of the rectifier 230 and an operation of the DC converter 240. In this case, the rectifier 230 may rectify the transferred RF power signal to a signal having a preset strength corresponding to the load 300. The rectifier 230 may transfer the rectified power signal to the DC converter 240, and the DC converter 240 may convert the power signal transferred from the rectifier 230 into a DC signal to output the DC signal to the load 300.

In this case, the controller 210 and the communication unit 220 may be operated by the power signal output from the rectifier 230.

Meanwhile, the RF power signal received by the receiving apparatus 200 may include the residual power in addition to the power required from the load 300. Accordingly, the rectifier 230 may transfer the residual power remained after supplying the power to the load to the residual power collecting unit 250.

The residual power collecting unit 250 may collect a power signal transferred from the rectifier 230. The residual power collecting unit 250 may provide information on the collected power amount to the controller 210. In this case, the controller 210 may control an on/off operation of the switch unit 260 for switching the power between the residual power collecting unit 250 and the energy regenerating unit 270 according to the power amount collected by the residual power collecting unit 250.

In this case, when an amount of the collected residual power is within a preset range, the controller 210 may control to turn the switch unit 260 on to transfer the collected residual power to the energy regenerating unit 270. The energy regenerating unit 270 may generate energy using the input residual power and supply the generated energy to the auxiliary battery 280. Accordingly, the auxiliary battery 280 may perform charging using the energy generated by the energy regenerating unit 270. In this case, the auxiliary battery 280 may provide charging power to the controller 210 and/or the communication unit 220 through the power selecting unit 290.

When the amount of the collected residual power exceeds a preset range, the controller 210 may control to turn the switch unit 260 off to prevent the collected residual power from being transferring to the energy regenerating unit 270.

The power selecting unit 290 may be connected to a power signal output terminal of the rectifier 230 and a power signal output terminal of the auxiliary battery 280. In this case, when the RF power signal is provided through the transmitting apparatus 100, the power selecting unit 290 may connect a power selection switch to the power signal output terminal of the rectifier 230. In this case, the power selecting unit 290 may provide the power signal (hereinafter, referred to as 'first power signal') output from the rectifier 230 as an operation power of the controller 210 and the communication unit 220.

Meanwhile, when the supply of the power to the load 300 is requested in a state in which the RF power signal is not provided from the transmitting apparatus 100 or the power is not supplied from an exterior at all, the controller 210 and the communication unit 220 may require an initial driving power to perform an operation of requesting the RF power signal to the transmitting apparatus 100.

To this end, the power selecting unit 290 may connect the power selection switch to the power signal output terminal of the auxiliary battery 280. In this case, the power selecting unit 290 may provide a power signal (hereinafter, referred to as 'second power signal') output from the auxiliary battery 280 as an operation power for initial driving of the controller 210 and the communication unit 220.

In this case, it is assumed that the auxiliary battery 280 is charged to a certain level or greater by using the residual power provided from the residual power collecting unit 250.

When the charged power of the auxiliary battery 280 is less than a certain level, and an amount of residual power collected by the residual power collecting unit 250 is within a preset range at a corresponding time point, the controller 210 may turn the switch unit 260 on to supply the residual power to the auxiliary battery 280.

Accordingly, when the supply of the power to the load 300 is requested in a state in which the RF power signal is not provided from the transmitting apparatus 100 or the power is not supplied from an exterior at all, the controller 210 and the communication unit 220 may receive the power from the auxiliary battery 280 to perform wireless communication with the transmitting apparatus 100. In this case, the transmitting apparatus 100 may search the reception resonator 201 of the receiving apparatus 200 base on a signal received from the communication unit 220 and transmit the RF power signal to the receiving apparatus 200.

After requesting the transmission of the RF power signal to the transmitting apparatus 100, when the RF power signal is received from the transmitting apparatus 100, the power selecting unit 290 may connect the power selection switch to the output terminal of the rectifier 230 and provide a first power signal to the controller 210 and the communication unit 220.

As described above, when the supply of the power from the exterior is blocked, the wireless power receiving apparatus 200 according to the present disclosure may initially drive the charged power of the auxiliary battery 280.

FIG. 3 is an exemplary diagram illustrating a power control operation of the wireless power receiving apparatus according to a first embodiment of the present disclosure. FIG. 3 illustrates that the power selection switch of the power selecting unit 290 is connected with the power signal output terminal of the rectifier 230. In addition, in FIG. 3, a solid line represents a flow of the power signal, and a dotted line represents a flow of a control signal.

Referring to FIG. 3, when the RF power signal is provided through the transmitting apparatus 100, the rectifier 230 may transfer a rectified power signal to the DC converter 240 and the power selecting unit 290. In this case, the DC converter 240 may convert the power signal provided from the rectifier 230 into a DC signal and output the DC signal to the load 300. Meanwhile, the power selection unit 290 may connect the power selection switch to a power signal output terminal of the rectifier 230, and provide a power signal output from the rectifier 230 as an operation power of the controller 210 and the communication unit 220.

Meanwhile, the rectifier 230 may transfer the residual power remained after supplying the power to the load 300 to the residual power collecting unit 250, and the residual power collecting unit 250 may collect the power signal provided from the rectifier 230. In this case, the residual power collecting unit 250 may provide information on the collected power amount to the controller 210.

When the amount of the residual power collected by the residual power collecting unit 250 is within a preset range, the controller 210 may control to turn the switch unit 260 on and transfer the collected residual power to the auxiliary battery 280 through the energy regenerating unit 270. In this case, the auxiliary battery 280 may perform charging using the residual power. Meanwhile, when the amount of the collected residual power exceeds a preset range, the controller 210 may control to turn-off the switch unit 260 to block the transfer of the collected residual power to the energy regenerating unit 270.

FIG. 4 is an exemplary diagram illustrating a power control operation of the wireless power receiving apparatus according to a second embodiment of the present disclosure. FIG. 4 illustrates that the power selection switch of the power selection unit 290 is connected with the power signal output terminal of the auxiliary battery 280. In addition, in FIG. 4, a solid line represents a flow of the power signal, and a dotted line represents a flow of a control signal.

Referring to FIG. 4, when the supply of the power to the load is requested in a state in which the RF power signal is not provided from the transmitting apparatus 100, the power selection unit 290 may connect the power selection switch with the power signal output terminal of the auxiliary battery 280 and provide the power signal output from the auxiliary battery 280 as an operation power for an initial driving of the controller 210 and the communication unit 220.

When the power amount charged in the auxiliary battery 280 is less than a certain level, the controller 210 may check an amount of residual power collected by the residual power collecting unit 250. When the amount of the residual power is within a preset range, the controller 210 may control to turn-on the switch unit 260 to supply the residual power to the auxiliary battery 280. Accordingly, the auxiliary battery 280 may perform a charging using the residual power. When the charged power amount is equal to or greater than a certain level, the auxiliary battery 280 may supply power to the power selection unit 290.

The power supplied by the auxiliary battery 280 may be transferred to the controller 210 and the communication unit 220, and the controller 210 and the communication unit 220 may perform an initial driving by the power supplied from the auxiliary battery 280. In this case, the controller 210 may attempt a wireless communication with the transmitting apparatus 100 through the communication unit 220, and may request the RF power signal to be supplied to the load to the transmitting apparatus 100 when the communication is connected.

Next, when the RF power signal is received from the transmitting apparatus 100, the power selection unit 290 may connect a power switch to the power signal output terminal of the rectifier 203 as illustrated in FIG. 3.

FIG. 5 and FIG. 6 are exemplary diagrams illustrating a charging operation of the auxiliary battery 280 of the wireless power receiving apparatus according to the present disclosure.

FIG. 5 illustrates an on operation state of the switch unit 260. FIG. 6 illustrates an off operation state of the switch unit 260.

When the residual power collecting unit 250 collects the residual power transferred from the rectifier, the controller 210 may check an amount of the residual power collected by the residual power collecting unit 250. In this case, the controller 210 may adjust the strength of the RF power signal transmitted from the transmitting apparatus according to the amount of the residual power collected by the residual power collecting unit 250.

As shown in FIG. 5, if the amount of the residual power P collected by the residual power collecting unit 250 is within a preset range, for example, if '$d1<P<d2$' is satisfied, the controller 210 may control to turn-on the switch unit 260. In this case, the residual power collected by the residual power collecting unit 250 may be transferred to the energy regenerating unit 270 to regenerate certain energy, and the auxiliary battery 280 may charge the battery using the regenerated certain energy.

Meanwhile, as shown in FIG. 6, when the amount of the residual power P collected by the residual power collecting unit 250 exceeds a preset range, for example, when 'd1≥P' or 'P≥d2', the controller 210 may control to turn-off the switch unit 260.

For example, when 'd1≥P', the controller 210 may determine that the load requires more power. Accordingly, the controller 210 may control to turn-off the switch unit 260 so that more power may be transferred to the load, thereby stopping the regeneration of the energy and the charging of the battery 280 for a moment. In this case, the controller 210 may perform wireless communication with the transmitting apparatus through the communication unit and may increase the strength of the RF power signal transmitted from the transmitting apparatus.

Meanwhile, when 'P≥d2', the controller 210 may determine that the load requires less power. Accordingly, in order to protect the generation of overload as an excessive power is transferred to the energy regenerating unit 270 all at once, the controller 210 may control to turn-off the switch unit 260 to stop the generation of the energy and the charging of the auxiliary battery 280. In this case, the controller 210 may perform the wireless communication with the transmitting apparatus through the communication unit and reduce the strength of the RF power signal transmitted from the transmitting apparatus.

FIG. 7 and FIG. 8 are flowcharts illustrating an operation flow of a power control method of the wireless power receiving apparatus according to the present disclosure.

First, referring to FIG. 7, the receiving apparatus according to the present disclosure may communicate with the transmitting apparatus (S110), and may receive the RF power signal having a requested strength (S120).

The receiving apparatus may rectify the RF power signal received at operation S120 and convert the rectified RF power signal into a DC signal (S130), and output the power required for the load 300 to the load 300 (S140).

When a residual power among the RF power signal received at operation S120 is generated (S150), the receiving apparatus may collect the residual power P (S160). When the amount of the collected residual power P satisfies a range of d1<P<d2 (S170), the receiving apparatus may charge the auxiliary battery using the residual power (S180). When the amount of the collected residual power P does not satisfy the range of d1<P<d2, the receiving apparatus waits for the charging operation of the auxiliary battery (S190).

Next, the receiving apparatus may determine the strength of the RF power signal received according to the residual power amount (S200), and transmit strength information of the RF power signal determined at operation S200 to the transmitting apparatus (S210).

In this case, the transmitting apparatus may adjust the strength of the RF power signal transmitted to the receiving apparatus to the strength requested at operation S210 to transmit the adjusted RF power signal to the receiving apparatus.

Meanwhile, as shown in FIG. 8, when the supply of the power to the load is required in a state in which the RF power signal is not received (S310, S315), the receiving apparatus may connect the auxiliary battery to the power selection switch for the initial driving (S320), and output power from the auxiliary battery (S330). The power outputted by the auxiliary battery may be used for initial driving of the receiving apparatus. The receiving apparatus may attempt to communicate with the transmitting apparatus using the power supplied from the auxiliary battery (S340).

When the communication between the receiving apparatus and the transmitting apparatus is connected (S350), the receiving apparatus may request the RF power signal to be supplied to a load to the transmitting apparatus (S360).

When the RF power signal is received from the transmitting apparatus according to a request of operation S360 (S310), the receiving apparatus may perform again a procedure after operation S103 of FIG. 7.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wireless power receiving apparatus comprising:
a residual power collecting unit configured to collect residual power remaining after supplying an RF power signal to a load while receiving the RF power signal from a wireless power transmitting apparatus through a resonator;
a power selecting unit configured to select one of the RF power signal and a power signal of an auxiliary battery according to a reception state of the RF power signal and output a power signal;
a communication unit configured to receive the power signal of the auxiliary battery from the power selecting unit and perform wireless communication with the wireless power transmitting apparatus, when a supply of power to the load is required in a state in which the transmission of the RF power signal from the wireless power transmitting apparatus is stopped; and
a controller configured to request the transmission of the RF power signal to be supplied to the load through the wireless communication with the wireless power transmitting apparatus.

2. The wireless power receiving apparatus of claim 1, wherein the power selecting unit selects the power signal of the auxiliary battery and supplies an operation power for an initial driving to the communication unit and the controller, when the supply of the power to the load is required in a state in which the RF power signal is not input.

3. The wireless power receiving apparatus of claim 1, further comprising a switch unit configured to switch the residual power output from the residual power collecting unit,
wherein the controller checks an amount of a collected residual amount, controls to turn-on the switch unit when the amount of the collected residual amount is within a preset range, and controls to turn-off the switch unit when the collected residual amount exceeds the preset range.

4. The wireless power receiving apparatus of claim 3, further comprising an energy regenerating unit configured to generate energy from the collected residual power to provide the generated energy to the auxiliary battery, when the switch unit is turned on.

5. The wireless power receiving apparatus of claim 1, wherein the controller controls strength of the received RF power signal through the wireless communication while receiving the RF power signal from the wireless power transmitting apparatus.

6. The wireless power receiving apparatus of claim 5, wherein the controller checks an amount of a controlled residual power and adjusts strength of the received RF power signal according to the amount of the collected residual power, and transmits strength information on the adjusted RF power signal to the wireless power transmitting apparatus.

7. The wireless power receiving apparatus of claim 5, wherein the controller adjusts strength of the received RF power signal according to a power amount required from the load and a reception state of the RF power signal, and transmits strength information on the adjusted RF power signal to the wireless power transmitting apparatus.

8. The wireless power receiving apparatus of claim 1, further comprising:
   a rectifier configured to rectify the RF power signal received from the wireless power transmitting apparatus; and
   a DC converter configured to convert the rectified RF power signal into a DC signal to provide the DC signal to a load connected to the wireless power receiving apparatus.

9. A power control method comprising:
   collecting residual power remaining after supplying an RF power signal to a load while receiving the RF power signal from a wireless power transmitting apparatus through a resonator;
   charging an auxiliary battery using the collected residual power;
   attempting wireless communication with the wireless power transmitting apparatus using a power signal output from the auxiliary battery when a supply of power to the load is required in a state in which transmission of the RF power signal from the wireless power transmitting apparatus is stopped; and
   requesting the transmission of the RF power signal to be supplied to the load to the wireless power transmitting apparatus.

10. The power control method of claim 9, further comprising:
    checking an amount of a collected residual amount when collecting the residual power;
    turning-on a switch unit which switches the residual power output to the auxiliary battery when the amount of the collected residual amount is within a preset range; and
    turning-off the switch unit when the collected residual amount exceeds the preset range.

11. The power control method of claim 10, further comprising generating energy from the collected residual power to provide the generated energy to the auxiliary battery, when the switch unit is turned-on.

12. The power control method of claim 9, further comprising controlling strength of the received RF power signal through the wireless communication while receiving the RF power signal from the wireless power transmitting apparatus.

13. The power control method of claim 12, wherein controlling strength of the received RF power signal comprises: checking an amount of the controlled residual power and adjusting strength of the received RF power signal according to the amount of the collected residual power, and transmitting strength information on the adjusted RF power signal to the wireless power transmitting apparatus.

14. The power control method of claim 12, wherein controlling strength of the received RF power signal comprises: adjusting strength of the received RF power signal according to a power amount required from the load and a reception state of the RF power signal, and transmitting strength information on the adjusted RF power signal to the wireless power transmitting apparatus.

15. A wireless power system comprising:
    a wireless power transmitting apparatus configured to convert an input power into an RF power signal to transmit the RF power signal through a resonator; and
    a wireless power receiving apparatus configured to receive the RF power signal transmitted from the wireless power transmitting apparatus through a resonator and provide the received RF power signal to a load, and collect residual power remaining after supplying the received RF power signal to the load to charge an auxiliary battery,
    wherein the wireless power receiving apparatus attempts wireless communication with the wireless power transmitting apparatus, when supply of power to the load is required in a state in which the transmission of the RF power signal from the wireless power transmitting apparatus is stopped, and requests transmission of an RF power signal to be supplied to the load to the wireless power transmitting apparatus.

* * * * *